Jan. 17, 1967 H. E. FORDYCE 3,298,672
COOLING TOWER DISTRIBUTION MANIFOLD HAVING FILTER SCREEN THEREIN
Filed Dec. 7, 1964
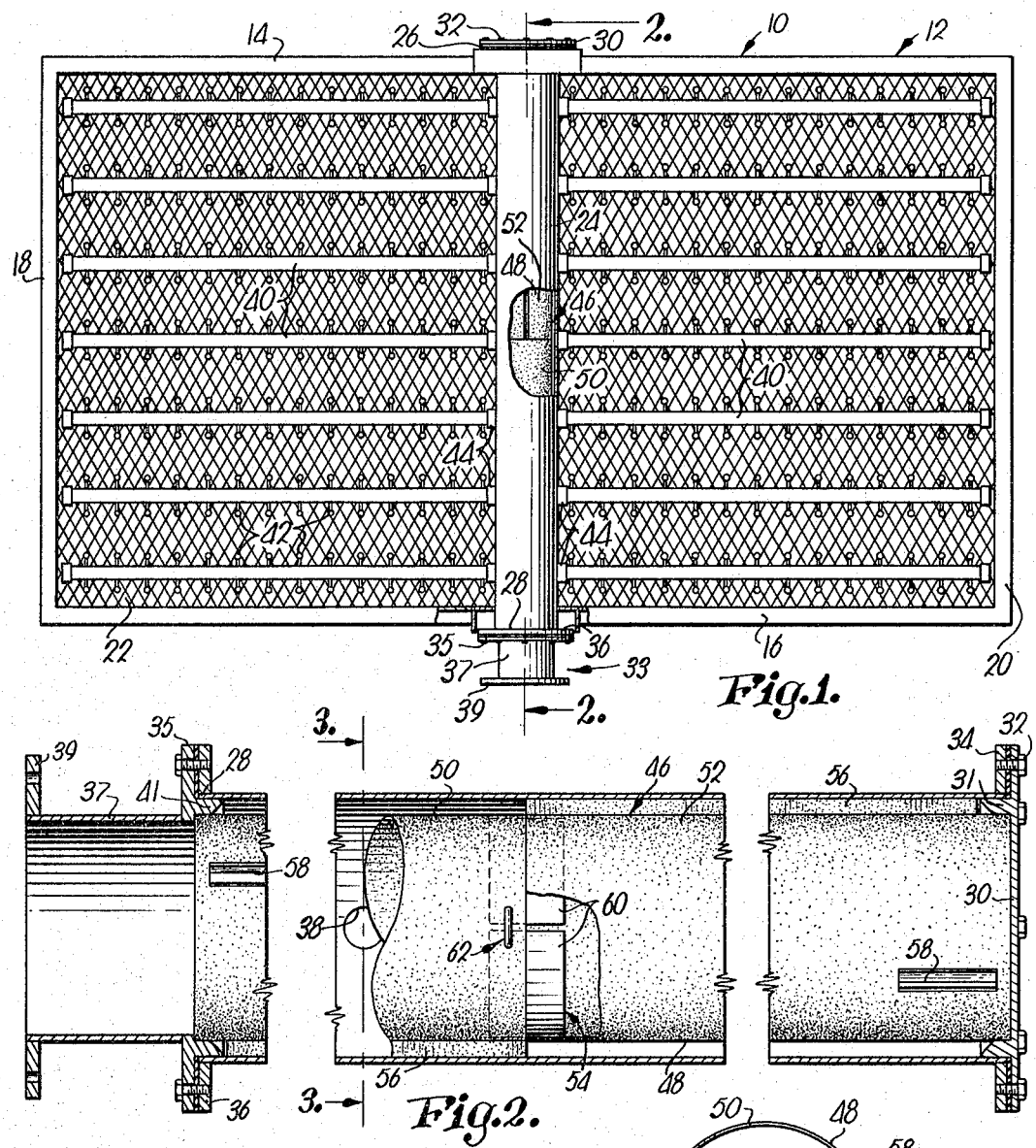
INVENTOR.
Homer E. Fordyce
BY
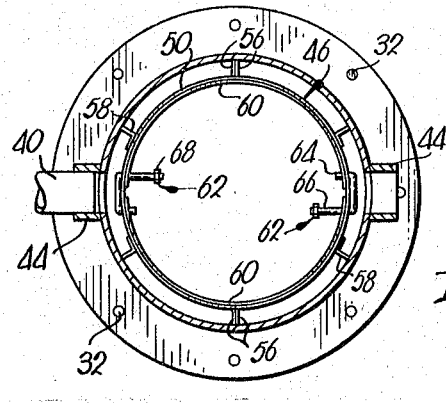
ATTORNEYS.

United States Patent Office 3,298,672
Patented Jan. 17, 1967

3,298,672
COOLING TOWER DISTRIBUTION MANIFOLD
HAVING FILTER SCREEN THEREIN
Homer E. Fordyce, Kansas City, Mo., assignor to The
Marley Company, Kansas City, Mo., a corporation of
Delaware
Filed Dec. 7, 1964, Ser. No. 416,202
3 Claims. (Cl. 261—4)

This invention relates to improvements in cooling tower equipment and has as its primary object the provision of an improver filter assembly for a cooling tower which is operable to effectively and efficiently remove solid materials from the liquid coolant which may find their way into the liquid during flow of the latter through the system.

In a conventional cooling tower having spray nozzle water distribution apparatus as a part thereof, the heat exchange unit of the same is normally provided with a casing having openings in the top or sides thereof for ingress or egress of air. By virtue of these openings in the casing, foreign matter such as bugs, dust, rocks, or the like, may collect on the unit within the path of travel of the coolant gravitating from the hot water distribution structure thereabove. These foreign particles are often small enough to be picked up by the coolant and conveyed therewith through the entire liquid circulation system. It can be appreciated that this foreign matter has a tendency to collect in the outlet orifices of the tower hot water distribution apparatus and thus the efficiency of the tower thereby materially reduced. The only alternatives at that time are to clean or replace the obstructed nozzles during which time the cooling tower must be shut down for the duration of the cleaning or replacement operation. Filters of various types have been previously suggested as well as used, to obviate this difficulty but they have been relatively expensive, difficult to clean and service, and frequently were not entirely satisfactory from an operation standpoint.

Removal of solid particles from the liquid to be cooled presents a particular problem in cooling towers having a hot water distribution system provided with a series of spray nozzles disposed to direct individual sprays of water onto a heat exchange unit located below the nozzles.

The present invention is operable to avoid the above-mentioned problems which may be attributed to collection of foreign matter in the liquid circulated through the cooling tower by providing a filter mounted directly on and forming a part of the tower which is effective to remove solid materials from the water before the same have an opportunity to collect in and thus clog the spray nozzles of the tower to any appreciable extent. As a result, the tower may be maintained in an operable condition except for short intervals of cleaning of the filter and maintenance costs associated with the tower are reduced. Substantial economies are also realized by virtue of placement of the filter in a readily accessible location so that the same can be cleaned or replaced in a minimum of time, with a minimum expenditure of effort, and with a minimum shutdown time of the assembly itself.

It is therefore, another object of the present invention to provide a filter unit for cooling towers especially adapted to form a part of and be mounted within the header manifold thereof so that water passing into the manifold must pass through the filter before reaching the headers attached thereto and thereby assuring complete filtering action at all times.

A further object of the instant invention is the provision of an improved filter for use with a cooling tower of the type described wherein the filter is mounted within the manifold in inwardly spaced relationship to the inner surface thereof whereby the entire surface of the filter is effective to remove impurities from the water supplied thereto.

Still another object of this invention is the provision of a water filtering unit of the aforesaid character which can be utilized with existing cooling tower assemblies with no modification thereto being required.

In the drawing:

FIGURE 1 is a top plan view of a counterflow cooling tower assembly showing the filter of the present invention within the header manifold of the assembly in a position to remove impurities from the coolant flowing into and through the manifold;

FIG. 2 is an enlarged, cross-sectional view taken along line 2—2 of FIG. 1

FIG. 3 is a view taken along line 3—3 of FIG. 2; and

FIG. 4 is an end elevational view of one of the two sections which defines the filter.

The present invention is especially useful in a cooling tower assembly having a tubular manifold spanning the distance between the opposed side walls of an open top casing provided with a perforate heat exchange unit and wherein the manifold is located above the unit. A number of tubular headers are carried by the manifold in fluid communication therewith and extend outwardly therefrom into positions in overlying relationship to the heat exchange unit. Spray nozzles on the outer ends of the headers are disposed to direct water onto the top of the heat exchange unit. Thus, water flowing into the manifold is subdivided and directed outwardly thereof into the headers and onto and through the heat exchange unit itself.

Means operable in conjunction with the manifold for filtering impurities from the water comprises a tubular, perforated member disposed within the manifold across the path of flow of water from the inlet to the openings of the manifold defining the fluid inlets to respective headers. Structure on the outer surface of the member maintains the same in inwardly spaced relationship to the inner surface of the manifold, whereby the entire surface of the member is effective to filter the water. The assembly is constructed to permit easy access to the member so that the same may be periodically removed for cleaning purposes and replaced with a minimum of interruption to the operation of the tower.

Cooling tower assembly 10 conventionally includes an open top casing 12 having a pair of opposed side walls 14 and 16, and a pair of end walls 18 and 20 spanning the distance between side walls 14 and 16. A heat exchange unit 22 is disposed within casing 12 in spaced relationship below the open top thereof, unit 22 having a plurality of surfaces for contacting a coolant gravitating onto unit 22 from above.

A tubular, open end manifold 24 spans the distance between side walls 14 and 16 and is disposed above unit 22. Means is provided at each of the ends 26 and 28 of manifold 24 for securing the latter to casing 12 in a generally horizontal disposition with respect thereto. A blind flange plate 30 is removably secured by bolts 32 to an annular flange 34 rigid to end 26 so that ready access may be had to the interior of manifold 24 from a location adjacent side wall 14. An annular ring 31 integral with the inner face of plate 30 fits within manifold 24 to present a circular inwardly facing shoulder for purposes to be described. Manifold 24 is provided with another annular flange 36 at end 28 thereof to which a conduit from the source of hot water to be cooled may be secured through the medium of spool and flange unit 33. The flange section 35 of unit 33 and adapted to be bolted directly to flange 36 as shown in FIGS. 1 and 2, has an opening therethrough of somewhat smaller diameter than the inside diameter of manifold 24. The annular ring 41 integral with the inner circular portion of flange 35 presenting the opening therethrough is the same size and configuration as ring 31 and also is adapted to fit complementally within manifold 24 and present a circular inwardly facing shoulder of the same diameter as the inner circular shoulder of ring 31. As is apparent in FIG. 2, the outer annular margins of rings 31 and 41 are beveled in a direction facing filter 46 to facilitate telescoping of corresponding ends thereof into respective rings. The spool 37 projecting outwardly from flange 35 mounts an outer flange section 39 which serves as a coupling for securing the water supply line to manifold 24.

A number of openings 38 are provided in manifold 24 at each side thereof respectively and aligned longitudinally thereof. Openings 38 define fluid outlets for manifold 24 and fluid inlets for respective headers 40, each of which comprises a perforated pipe having a series of spaced distribution nozzles 42 located along the longitudinal length thereof and extending in opposite directions from the latter. For purposes of illustration, a collar 44 surrounds each opening 38 respectively and is rigid to and extends laterally from the outer surface of manifold 24. Headers 40 are disposed within respective collars 44 as illustrated in FIG. 3. Thus, water flowing into manifold 24 will pass out of the latter through openings 38 and into respective headers 40. Thereafter, the water flows into, through and out of nozzles 42 for gravitation onto unit 22. The outer ends of headers 40 are capped to cause the water to be discharged only through nozzles 42.

Means for filtering impurities from the water supplied to manifold 24 is broadly denoted by the numeral 46 and includes a tubular, perforated filter member 48 having a pair of sections 50 and 52 and structure 54 for releasably interconnecting sections 50 and 52. Each of the sections 50 and 52 is formed from a generally rectangular, initially flat sheet of bendable, perforate metal material, the sheet being rolled and bent to define a generally circular cross section as illustrated in FIGS. 3 and 4 and to present a pair of longitudinally extending flanges 56 integral with the outer, opposed, longitudinal edges thereof. As illustrated in FIG. 4, flanges 56 are normally juxtaposed and are interconnected in any suitable manner, such as by rivets or spotwelding, so that the corresponding section will retain its tubular configuration.

A pair of transversely L-shaped elements 58 are rigidly secured to the outer surface of each of the sections 50 and 52 at each of the ends thereof. Elements 58 at respective extremities of the sections are separated from each other by an arcuate distance of approximately 120° and are separated from flanges 56 by substantially the same arcuate distance.

When sections 50 and 52 are interconnected by structure 54, the length of filter member 48 is substantially equal to the length of manifold 24. Generally, the length of manifold 24 is considerable so that it is found to be more practical to construct member 48 in at least a pair of sections as illustrated. However, it is to be understood that member 48 could be of one-piece construction without departing from the scope of the invention.

Structure 54 includes a pair of arcuate bands 60 which are configured to substantially conform to the inner surfaces of sections 50 and 52. As shown in FIG. 2, bands 60 are in vertically spaced relationship with the lower band being secured to and projecting outwardly from section 50 and the upper band being secured to and extending outwardly from section 52. When sections 50 and 52 are in end-to-end relationship, bands 60 are telescoped therewithin.

A pair of J-shaped pins 62, each having a pair of legs 64 and 66 are used for releasably interconnecting bands 60 and thereby sections 50 and 52. Legs 66 of pins 62 are shiftably carried by section 50, the latter being provided with a pair of holes which are alignable with a pair of openings in the band 60 secured to section 52.

Thus, when the aforesaid holes and openings are aligned, legs 64 of pins 62 may extend therethrough in the manner shown in FIG. 3 to thereby interconnect sections 50 and 52. A stop 68 is provided on the inner end of each leg 66 to limit the outward movement thereof.

When member 48 is inserted within manifold 24, it is desired that substantially all of the water supplied to manifold 24 through open end 28 thereof, pass through member 48 before flowing through openings 38. To this end, the outer extremity of section 52 preferably engages the inner surface of closure plate 30 within supporting ring 31 and the outer end of section 50 engages the inner face of flange section 35 within complemental ring 41. It is to be understood in this respect that flanges 56 are cut away to an extent necessary only to clear respective rings 31 and 41. Similarly, elements 58 are located inwardly of corresponding extremities of sections 50 and 52 to clear rings 31 and 41. Thus, there will be no substantial flow of water between section 52 and the inner surface of cover plate 30.

In operation, member 48 is disposed within manifold 24 such that the ends of member 48 are at the ends 26 and 28 of manifold 24 and telescoped within respective rings 31 and 41. Thus, all of the water passing into open end 28 must flow through sections 50 and 52 in order to reach openings 38 for flow outwardly of manifold 24 into headers 40. In its operative position, member 48 is spaced inwardly from the inner surface of manifold 24 in the manner shown in FIGS. 2 and 3 whereby substantially the entire portion of member 48 may be utilized for filtering particulate materials in the water. This is accomplished by the provision of elements 58, as well as flanges 56 on sections 50 and 52, flanges 56 and elements 58 normally engaging the inner surface of manifold 24. As shown in FIG. 2, elements 58 are disposed substantially at the outermost ends of sections 50 and 52. It can be seen that rings 31 and 41 serve to maintain the ends of filter 46 in circular configuration and to eliminate close make-up length of the latter.

When it is desired to remove member 48 for cleaning purposes, cover plate 30 may be removed so that access to the interior of manifold 24 may be had. Member 48 may thus be withdrawn from manifold 24 and cleaned in any suitable manner. In this respect, section 52 may be separated from section 50 before the latter is withdrawn from manifold 24. This may be done if member 48 is too long to be easily handled.

After member 48 has been cleaned it is replaced within manifold 24 and the latter is closed by securing cover plate 30 thereto by bolts 32. The cleaning operation may be accomplished in a minimum of time so that the water flow into manifold 24 need be stopped for only a relatively short period of time. Moreover, the cleaning operation may be performed by a single workman with no special skills and without the use of special tools.

The sheets forming sections 50 and 52 may be of any suitable corrosion-resistant material such as wire screen, perforated sheet metal or a cylindrical synthetic resin member having openings therein of appropriate size. Moreover, since water is generally used as the coolant in an assembly of the type described, the material forming sections 50 and 52 is preferably of the type which is not deleteriously affected by the water flow, such a material being stainless steel or the like. Thus, member 48 will have a long operating life to thereby minimize the cost of maintaining the coolant free of impurities.

Although the present filter assembly has been particularly shown and described with reference to a counterflow water cooling tower having a series of spray nozzles located about the heat exchange unit of the tower, it is to be appreciated that the novel filters illustrated and explained herein have equal utility for use in all types of liquid cooling apparatus wherein a header or manifold conduit is employed for directing liquid to be cooled onto the heat exchange unit. In this respect, member 48 may be of any size or of any desired configuration and is not limited to a cylindrical configuration as illustrated.

Having thus described the invention, what is claimed as new and desired to be secured by Letters Patent is:

1. In a cooling tower having a casing adapted to contain a heat exchange unit, the combination with said casing of:
   a tubular manifold provided with a fluid inlet and having a number of spaced, perforated, tubular headers in fluid communication therewith and extending outwardly therefrom, said manifold being adapted to receive a flow of coolant through said fluid inlet thereof and to direct said coolant into said headers;
   means mounting said manifold on said casing with said headers positioned above a heat exchange unit when the latter is contained in said casing; and
   means within said manifold for filtering impurities from said flow of coolant, said filtering means including a perforated tube within and extending longitudinally of said manifold, said tube being disposed across the path of flow of said coolant from said inlet to said headers and being defined by a pair of sections in end-to-end relationship, there being provided means releasably interconnecting proximal ends of said sections.

2. In a cooling tower having a pair of spaced side walls and a heat exchange unit between said side walls, the combination with said casing of:
   a tubular manifold having a pair of opposed open ends and provided with a number of longitudinally spaced, generally aligned openings, one of said open ends defining a fluid inlet and said openings defining fluid outlets for said manifold, said manifold being adapted for receiving a flow of a coolant through said inlet and to discharge said coolant through said outlets;
   removable means closing the other open end of said manifold;
   means mounting said manifold on said side walls in spanning relationship thereto and above said heat exchange unit;
   a tubular header for each opening respectively, said headers extending laterally from the manifold and being in fluid communication therewith to receive coolant therefrom, each header having a series of nozzles thereon for the discharge of coolant therefrom;
   a tubular, open end filter member within said manifold of less diameter than the latter and extending substantially the entire length thereof, one end of said filter member being in substantial engagement with said closing means and the other end thereof being in surrounding relationship to said inlet, whereby the coolant must pass through said filter member in flowing from said inlet to said outlet;
   means on said filter member for maintaining the latter in equally spaced relationship from the inner surface of said manifold around the circumference thereof said filter member being defined by a pair of sections disposed in end-to-end relationship; and
   means releasably interconnecting proximal ends of said sections.

3. A cooling tower as set forth in claim 2 wherein is provided ring means on the manifold at opposed ends thereof telescoped within and engaging corresponding ends of the filter member for assuring flow of substantially all of the coolant supplied to the manifold through the filter member.

References Cited by the Examiner

UNITED STATES PATENTS

| 661,373 | 11/1900 | Jandus | 210—451 X |
| 2,507,591 | 5/1950 | Cox | 210—452 X |
| 2,606,663 | 8/1952 | Blackman et al. | 210—451 X |
| 2,775,310 | 12/1956 | Shelton | 55—228 X |

FOREIGN PATENTS

| 766,978 | 1/1957 | Great Britain. |

HARRY B. THORNTON, *Primary Examiner.*

RONALD R. WEAVER, *Examiner.*